United States Patent [19]
Yoshio

[11] Patent Number: 4,870,512
[45] Date of Patent: Sep. 26, 1989

[54] DATA RECORDING AND REPRODUCING DEVICE

[75] Inventor: Junichi Yoshio, Saitama, Japan

[73] Assignee: Pioneer Electronic Corporation, Tokyo, Japan

[21] Appl. No.: 244,895

[22] Filed: Sep. 14, 1988

[30] Foreign Application Priority Data

Mar. 16, 1988 [JP] Japan .................................. 63-060502

[51] Int. Cl.$^4$ .............................................. G11B 5/09
[52] U.S. Cl. ......................................... 360/32; 360/46
[58] Field of Search ...................... 360/32, 46; 341/132

[56] References Cited

U.S. PATENT DOCUMENTS 4,726,067  2/1988  Alonso ................................... 360/32
4,794,469  12/1988 Kaida et al. ........................... 360/46

Primary Examiner—Vincent P. Canney
Attorney, Agent, or Firm—Sughrue, Mion, Zinn, Macpeak & Seas

[57] ABSTRACT

A data recording and reproducing device including a recording device which makes a determination of the level of an input signal every predetermined period, converts the input signal, which has been level-controlled according to the result of the determination into a digital signal, and records the digital signal together with the result of the determination on a recording medium; and a reproducing device which reads the digital signal from the recording medium and converts the digital signal thus read into an analog signal, while level-controlling the analog signal according to the result of the determination, and outputting the analog signal thus level-controlled.

11 Claims, 1 Drawing Sheet

DATA RECORDING AND REPRODUCING DEVICE

BACKGROUND OF THE INVENTION

1. Field of the Invention

This invention relates to a data recording and reproducing device for recording and reproducing analog signals such as music signals and image signals in a digital mode.

2. Description of the Prior Art

In a digital audio device for recording and reproducing music signals in a digital mode, a music signal is sampled with a predetermined sampling frequency so that it is converted into a digital signal of several bits per sampling, for instance sixteen (16) bits per sampling, and the digital signal thus obtained is recorded. If, in this case, the "fortissimo" of a music signal (loud portions) is recorded with full bits (all the bits being "1"), then a small signal such as "pianissimo" (soft portions) will be recorded with only a few bits; that is, the recording operation is greatly affected by quantization noise.

In order to minimize the effect of quantization noise, several methods have been provided for the signal reproducing device. For instance, in one method, a digital filter is used to multiply the sampling frequency, and the data value obtained is outputted with up to eighteen bits, so that it is converted into an analog signal with an 18-bit DA converter. Another method, applies to the case where a digital signal recorded on a recording medium is converted into an analog signal with a DA (digital-to-analog) converter, and a small signal is utilized in which the effective bits are not high-order bits. The digital signal is subjected to digital-to-analog conversion after being shifted to the high-order bits, and the gain obtained through the shifting of the signal is attenuated by the analog circuit on the output side to thereby obtain the original signal level.

In each of these methods, during recording of data on the recording medium, the data as well as quantization noise is recorded. Accordingly, improvement of the signal reproducing device by these conventional methods is limited. That is, since only fixed data of 16 bits per sampling is recorded on the recording medium, the data may be improved to the accuracy of 16 bits. Based on theis limitation, it is fundamentally impossible to obtain data having a higher accuracy. Accordingly, in the conventional methods, the small signal cannot be improved with respect to the quantization noise.

SUMMARY OF THE INVENTION

An object of this invention is to reduce the quantization noise in recording and reproducing an input signal in a digital mode, particularly for small input signals.

A data recording and reproducing device according to the invention includes a recording means which makes a determination of the level of an input signal every predetermined period, converts the input signal, which has been level-controlled according to the result of the determination, into a digital signal, and records the digital signal together with the result of the determination on a recording medium; and reproducing means which reads the digital signal from the recording medium and converts the digital signal thus read into an analog signal, while level-controlling the analog signal according to the result of the determination, and outputting the analog signal thus level-controlled.

In the data recording and reproducing device of the invention, the level of the input signal is determined every predetermined period, and the level of the input signal is controlled according to the result of the determination. That is, when the input signal is a small signal whose level is lower than a predetermined value, it is converted into a digital signal after being amplified; whereas when the level of the input signal is higher than the predetermined value, it is converted directly into a digital signal. The digital signal thus obtained is recorded on the recording medium. In this operation, data identifying the result of the determination with regard to the predetermined level is also recorded on the recording medium.

The digital signal read from the recording medium is converted into an analog signal, and the analog signal is level-controlled according to the data indicating the result of the determination with regard to the predetermined level, so that the signal recorded after being amplified is restored to its original level.

As a result, a small signal which is liable to be affected by quantization noises, is recorded after being amplified and subjected to analog-to-digital conversion, and it is restored to its original analog level when reproduced after digital-to-analog conversion, so that the noise will not significantly affect the small signals.

DETAILED DESCRIPTION OF THE PREFERRED EMBODIMENTS

Figure 1:
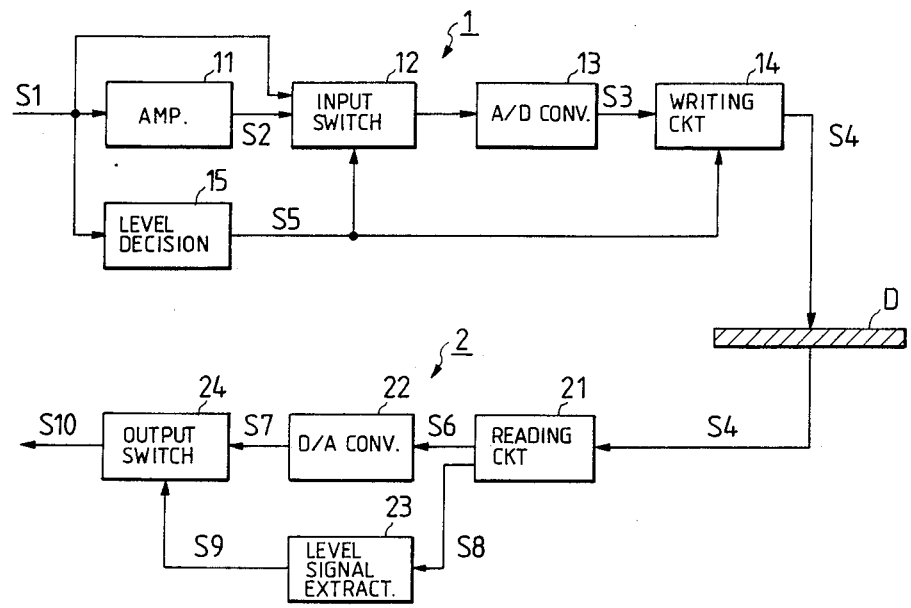
FIG. 1 is a block diagram showing an embodiment of a data recording and reproducing device according to this invention.

FIG. 1 is a block diagram showing one example of a data recording and reproducing device according to this invention. In the following description, a compact disc system (hereinafter referred to as "a CD system", when applicable) is employed as the data recording and reproducing device by way of example.

The CD system comprises a recording section 1 for digitally recording music signals on a record carrier, namely, a disc D and reproducing section 2 for reading digital signals from the disc D and converting them into analog signals which are outputted.

The recording section 1 has an amplifier 11 for amplifying an input signal S1 to provide an output signal S2, an input switching circuit 12 for selecting the input signal S1 or the output signal S2, an AD (analog-to-digital) converter 13 for converting the signal S1 or S2 thus selected into a digital signal S3 and a writing circuit 14 for converting the digital signal S3 into record data S4 having a predetermined record format and recording the data S4 in the disc D. Recording section 1 also has a level decision circuit 15 which detects the level of the input signal S1 every predetermined period of time T to determine whether or not the level is lower than a predetermined value, and which, when it is determined that the level is lower than the predetermined value, outputs a level switching signal S5 to control the input switching circuit 12 to select the output signal S2 of the amplifier 11. The selection of the signal S1 or S2 according to the output of the decision circuit 15 is recorded as level switching data in the sub-code of the record data S4 formed by the writing circuit 14.

The reproducing section 2 has a reading circuit 21 for reading record data S4 from the disc D and decoding the data S4, a DA (digital-to-analog) converter 22 for converting the digital data signal S6 outputted by reading circuit 21 into an analog signal S7 and a level signal extracting circuit 23 for extracting a level switching signal S9 from sub-code data S8 also outputted by the reading circuit 21. Reproducing section 2 also has an output switching circuit 24 which, with the aid of the level switching signal S9, switches the level of the music signals S7 in order to output a reproducing music signal S10.

Figure 2:
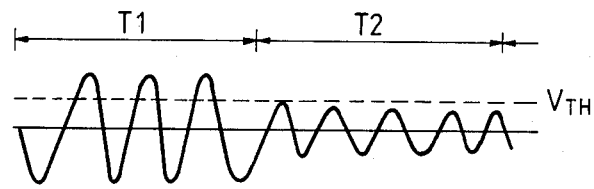
FIGS. 2 and 3 are waveform diagrams for a description of the operation of the device as shown in FIG. 1.
Figure 3:
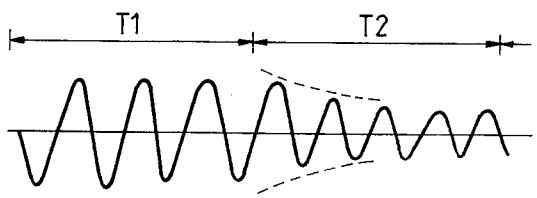

The operation of the CD system thus arranged may be described with reference to waveform diagrams shown in FIGS. 2 and 3.

The music signal S1 applied to the recording section 1 is connected directly to the input switching circuit 12, and at the same time is applied to the circuit 12 after being amplified by the amplifier 11. The music signal S1 is further connected to the level decision circuit 15. As shown in FIG. 2, it is determined every period of time T (T1, T2, ...) whether or not the level of the input signal is lower than a predetermined threshold value $V_{TH}$. When it is determined that the level of the input signal is lower than the threshold value $V_{TH}$, the decision circuit 15 outputs the level switching signal S5. The signal S5 is applied to the input switching circuit 12 so that the signal S2 amplified by the amplifier 11 is applied to the AD converter 13.

In the AD converter 13, the music signal S1 or S2 is sampled with a predetermined sampling frequency and outputted as a digital signal S3 of 16 bits per sampling. Since, the level of the signals S1 or S2 inputted to the AD converter 13 is higher than the predetermined value $V_{TH}$, they are converted into the digital signal S3 which is less affected by quantization noise.

In the writing circuit 14, the digital signal S3 is converted into the record data S4 having a predetermined recording format by subjecting it, for instance, to EEM modulation, and the record data S4 is recorded on the disc D. In this operation, the level switching signal S5 is also recorded as sub-code.

The record data S4 thus recorded in the disc D is read by the reproducing section 2. In the reproducing section 2, the reading circuit 21 reads the record data S4 from the disc D and decodes the data recorded in the predetermined recording format. Of the data thus decoded, the music data S6 is converted into an analog signal S7 by the DA converter 22 which is supplied to the output switching circuit 24, and the sub-code data S8 is supplied to the level signal extracting circuit 23 which outputs the level switching signal S9. The switching signal S9 controls the output switching circuit 24 so that the signal S2 amplified by the amplifier 11 prior to being recorded is outputted as a reproducing signal S10 after being attenuated, whereas the signal S1 which is not amplified before being recorded is outputted directly as a reproducing music signal S10.

Thus, all the small signals whose levels are lower than the threshold value $V_{TH}$ during the period T are recorded after being amplified and subjected to analog-to-digital conversion. Therefore, the resultant music signal is less affected by quantizing noise.

The level switching signal S5 to be recorded in the sub-code during recording should be recorded a predetermined period of time prior to the digital signal S3 in the corresponding period T, with the time required for a gain switching operation during reproduction taken into consideration.

In the above-described embodiment, the level switching operation is carried out instantaneously every period T. However, with the reproducing characteristic taken into account, practically the level switching operation should be carried out moderately and continuously as is apparent from the waveform diagram of FIG. 3. For this purpose, in the case where the switching interval is several hundreds of micro-seconds (msec), it is desirable that the period T is set to several times the switching interval. In this case, two systems are available. In the first system, the level switching operation is carried out instantaneously in the recording operation, and it is performed slowly in the reproducing operation. In the second system, the gain is switched slowly also in the recording operation, and in the reproducing operation is it switched slowly with the characteristic reversed.

In the above-described embodiment, only one threshold level is provided for the switching operation. However, the device may be so modified that a plurality of threshold levels are employed to perform the level switching operation at a plurality of stages.

While the invention has been described with reference to the CD system, it should be noted that the invention is not limited thereto or thereby. It goes without saying that the technical concept of the invention is applicable to a system in which music signals and image signals are digitally recorded on the reproduced from a recording medium such as a disc or tape.

In the data recording and reproducing device of the invention, during recording of an input signal as a digital signal on the recording medium the level of the input signal is determined every predetermined period, so that the level of the input signal is controlled every predetermined period. Therefore, with the device of the invention, an input signal of low level can be recorded after being amplified and converted into a digital signal, and therefore a reproducing signal less affected by quantization noise can be obtained.

What is claimed is

1. A data recording and reproducing device, comprising:
    recording means, including means for determining the level of an input signal every predetermined period, means for amplifying said input signal, means for selecting one of said input signal and said amplified input signal based on the output of said determining means, means for converting said selecting signal into a digital signal, and means for recording said digital signal together with the output of said determining means on a recording medium; and
    reproducing means, including means for reading said digital signal from said recording medium, means for converting said digital signal read by said reading means into an analog signal, means for extracting said recorded output of said determining means, and means for attenuating said analog signal according to the output of said extracting means, and outputting said analog signal thus attenuated.

2. A data recording and reproducing device as claimed in claim 1, wherein said output of said determining means is recorded as sub-code data on said recording medium.

3. A data recording and reproducing device as claimed in claim 2 wherein said sub-code data is recorded on on said recording medium a said predetermined period prior to the corresponding digital signal.

4. A data recording and reproducing device as claimed in claim 1, wherein said determining means determines whether said level of said input signal is lower than a threshold value.

5. A data recording and reproducing device as claimed in claim 4, wherein said means for selecting selects said amplified input signal when said input signal is lower than said threshold value.

6. A data recording and reproducing device as claimed in claim 4, wherein said means for selecting selects said input signal when said input signal is greater than said threshold value.

7. A data recording and reproducing device as claimed in claim 1, wherein said determining means determines whether said level of said input signal is lower than a plurality of threshold values.

8. A data recording and reproducing device as claimed in claim 7, wherein said means for amplifying amplifies said input signal to a plurality of amplified levels.

9. A data recording and reproducing device as claimed in claim 8, wherein said means for selecting selects said input signal when said level of said input signal is lower than each of said plurality of threshold values, and selects one of said plurality of amplified levels when said level of said input signal is greater than at least the lowest one of said plurality of threshold values.

10. A data recording and reproducing device as claimed in claim 8, wherein said recording medium is a disc.

11. A data recording and reproducing device as claimed in claim 8, wherein said recording medium is a recording tape.

* * * * *